United States Patent [19]

Noh

[11] Patent Number: 5,929,957
[45] Date of Patent: Jul. 27, 1999

[54] LIQUID CRYSTAL DISPLAY CELL AND METHOD OF MAKING THE SAME

[75] Inventor: Seong-hee Noh, Kyungki-do, Rep. of Korea

[73] Assignee: Samsung Display Devices Co., Ltd., Kyungki-do, Rep. of Korea

[21] Appl. No.: 08/859,499

[22] Filed: May 20, 1997

[30] Foreign Application Priority Data

Dec. 5, 1996 [KR] Rep. of Korea ............. 96-61928

[51] Int. Cl.⁶ .................. G02F 1/1337; G02F 1/13
[52] U.S. Cl. ............... 349/127; 349/124; 349/123; 349/187
[58] Field of Search .................. 349/124, 127, 349/187, 123, 128, 191, 74, 183

[56] References Cited

U.S. PATENT DOCUMENTS 5,032,009  7/1991  Gibbons et al. .............. 350/341
5,262,882  11/1993  Hikmet .......................... 359/75
5,528,401  6/1996  Narutaki et al. ................ 359/76
5,602,661  2/1997  Schadt et al. .................. 349/124

FOREIGN PATENT DOCUMENTS

0506175A2  9/1992  European Pat. Off. .
4-338925  11/1992  Japan .

*Primary Examiner*—William L. Sikes
*Assistant Examiner*—Joanne Kim
*Attorney, Agent, or Firm*—Christie, Parker & Hale, LLP

[57] ABSTRACT

Disclosed is a liquid crystal display cell comprising first and second panels spaced apart from each other and extending parallel to each other, first and second conductive layers respectively disposed on and between the first and second panels, first and second orientation layers covering the first and second conductive layers, respectively, and a liquid crystal layer disposed between the first and second orientation layer. Each of the first and second orientation layers comprises a polymer material and a liquid crystal material dispersed within the polymer.

19 Claims, 1 Drawing Sheet

LIQUID CRYSTAL DISPLAY CELL AND METHOD OF MAKING THE SAME

FIELD OF THE INVENTION

The present invention relates to a liquid crystal display cell ("LCD") cell with an inventive orientation layer and a method for manufacturing the same.

BACKGROUND OF THE INVENTION

Generally, an LCD cell is structured such that liquid crystal molecules are injected between two plates, and by regulating power of an electric field, the amount of light transmission is controlled.

As shown in FIG. 2, the conventional LCD cell is made by depositing conductive layers 3 on each of two glass plates 2, forming orientation layers 4 on each of the conductive layers 3, dispersing spacers 5 between the two glass plates 2, sealing an edge portion by using a sealant 8, and forming a liquid crystal layer by injecting liquid crystal molecules 7.

The above LCD cell controls an arrangement of liquid crystal molecules 7 by providing the conductive layer 3 with an electric field through drive integrated circuits.

Further, the liquid crystal orientation layer 4 is made of a polyamide layer deposited on the glass plates 2 through a printing process, and an orientation process is conducted by rubbing a surface of the polyamide layer with a soft cloth.

In the conventional LCD cell formed as described above, because the orientation layer is formed by performing an orientation process requiring rubbing, static electricity is created and the LCD cell is contaminated by dust and other foreign substances transferred from the cloth.

SUMMARY OF THE INVENTION

The present invention has been made in an effort to solve the above problems.

It is an object of the present invention to provide an LCD cell that does not require a rubbing process and, thus, solves the above-described static electricity and foreign substances problems.

To achieve the object, in the present invention. An orientation layer of the LCD cell is made from a liquid crystal polymer material or other polymer materials where liquid crystal molecules are dispersed. Here, without utilizing a rubbing process, orientation of the liquid crystal molecules of the liquid crystal layer is performed by means of the interaction between the liquid crystal molecules dispersed in the polymer material of the orientation layer and the liquid crystal molecules of the liquid crystal layer.

BRIEF DESCRIPTION OF THE DRAWINGS

The accompanying drawings, which are incorporated in and constitute a part of the specification, illustrate an embodiment of the invention, and, together with the description, serve to explain the principle of the invention.

DETAILED DESCRIPTION

A preferred embodiment of the present invention will now be described in detail with reference to the accompanying drawing.

Figure 1:
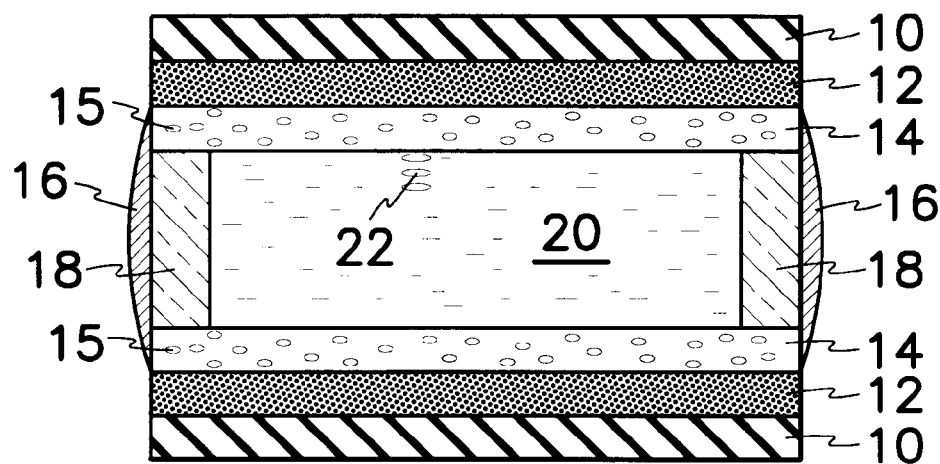
FIG. 1 is a sectional view of an LCD cell according to a preferred embodiment of the present invention.
Figure 2:
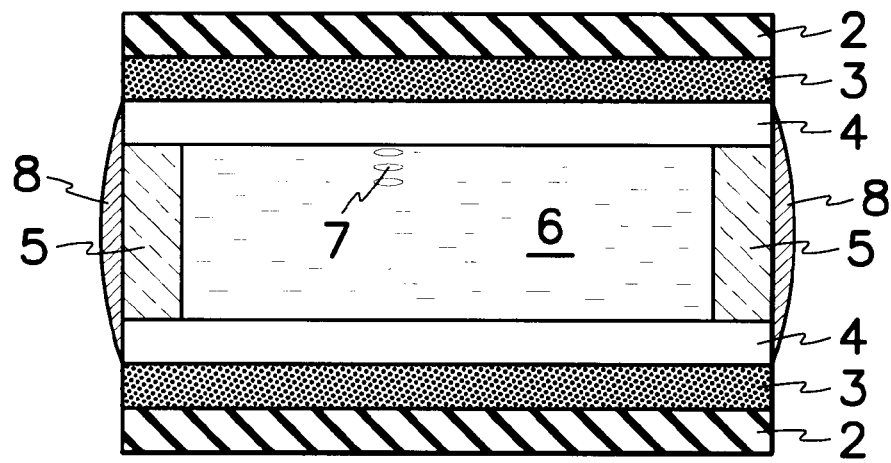
FIG. 2 is a sectional view illustrating a conventional LCD cell.

As shown in FIG. 1, an LCD cell according to a preferred embodiment of the present invention is made by depositing a conductive layer 12 on upper and lower glass plates 10; depositing an orientation Layer 14, made from polymer materials in which liquid crystal molecules 15 are dispersed, on the conductive layer 12; distributing spacers 18 between the two glass plates 10; sealing outside edge portions using a sealant 16 except a portion through which liquid crystal molecules will be injected; and injecting liquid crystal molecules 22 to form a liquid crystal layer 20 between the two glass plates 10.

The liquid crystal molecules 15 dispersed in the polymer will be referred to as dispersive liquid crystal molecules hereinafter to distinguish them from the liquid crystal molecules 22 of the liquid crystal layer 20. The orientation layer 14 made from the polymer materials each containing the dispersive liquid crystal molecules 15 will be referred to as a liquid crystal orientation layer.

Other polymer material constituting the dispersive liquid crystal orientation layer 14 may be selected from one of the following polymer materials: polyimide, polyamide or liquid crystal polymer(LCP).

In the above, it is preferable that an amount of the dispersive liquid crystal molecules 15 dispersed in the polymer material is about 5–30 Wt %.

That is, a polymer solution and a liquid crystal solution are respectively prepared by melting a polymer material and a liquid crystal material into solvents. Then, the polymer solution and the liquid crystal solution are mixed together. This mixed solution is deposited on the glass plates and then evaporated in a vacuum, thereby forming the liquid crystal orientation layer 14.

The solvent is preferably selected from one of r-butyrolactone, cyclohexanone, tetrachloroethane, N-methyl pyrrolidinone (NMP), and other such solvents.

In the above LCD cell, before injecting liquid crystal molecules into the LCD cell, the cell is heat-treated at a temperature higher than an isotropic temperature of the dispersive liquid crystal orientation layer 14 so that the dispersive liquid crystal molecules can display liquid crystal qualities in the cooling process of the cell. Preferably, the liquid crystal molecules 22 are injected into the LCD cell during the cooling process so that the orientation of the liquid crystal molecules 22 of the liquid crystal layer 20 is created by means of the interaction between the dispersive liquid crystal molecules 15 and the liquid crystal molecules 22. The orientation of the dispersive liquid crystal molecules 15 is determined by the interaction between a dielectric constant of a longitudinal axis direction of each of the dispersive liquid crystal molecules 15 and a dielectric constant of a longitudinal axis direction of the liquid crystal molecules 22 of the liquid crystal layer 20. That is, when the dispersive liquid crystal molecules 15 display liquid crystal qualities during the cooling process, the liquid crystal molecules 22 of the liquid crystal layer 20 perform orientation by means of the interaction by a dipole moment according to the dispersive liquid crystal molecules 15 and the dielectric constant of the longitudinal axis direction, while a pretilt angle is formed according to the extent of this interaction.

To make the above-described LCD cell, various tests were performed. Materials used in the tests were as follows:

1. Polymer for the liquid crystal orientation layer: polyimide sold under the trademarks "SE5291", and liquid crystal polymers sold under the trademark "LCP94", "LCP95", "LCP100" and "LCP105".
2. Liquid crystal materials sold under the trademarks "ZLI1132", "ZLI2293", and "ZLI3086".

3. Solvents: Cylohexanone, NMP, r-butyrolactone, and tetrachloroethane.
4. Wt % of the polymer melted in the solvent: 2 Wt %
5. Wt % of the liquid crystal material dispersed in the polymer: 5 Wt %

Test Results

The following were the test results of the fusible extent of the liquid crystal materials and the polymer material in the solvents:

1. In NMP, SE5291 and LCP95 showed high fusibility, ZLI1132 showed normal fusibility, and ZLI3086 showed normal fusibility after forming a clump.
2. In r-butyrolactone, SE5291 and LCP95 showed high fusibility, and ZLI1132 showed normal fusibility.
3. In cyclohexanone and tetrachlorethane, all liquid crystal and polymer materials showed high fusibility.

The following were the test results of the extent of the orientation and the pretilt angle when the liquid crystal orientation layer 14 was formed with SE5291 and the dispersive liquid crystal molecules.

1. Using NMP as a solvent and ZLI1132 as the dispersive liquid crystal molecules 15 in the liquid crystal orientation layer 14 formed on the upper and lower glass plates 10:
   (a) When ZLI1132 was used as the liquid crystal molecules 22 forming the liquid crystal layer 20, orientation was not performed;
   (b) When ZLI 2293 was used, orientation was normal and the pretilt angle was 0.37±0.42°; and
   (c) When ZLI3086 was used, orientation was not performed.
2. Using NMP as a solvent and ZLI1132 as the dispersive liquid crystal molecules 15 in the dispersive liquid crystal orientation layer 14 formed on the liquid crystal orientation layer 14 formed on the upper glass plate 10, and ZLI3086 as the dispersive liquid crystal molecules 15 in the dispersive liquid crystal orientation layer 14 formed on the lower glass plate 10:
   (a) When ZLI1132 was used as the liquid crystal molecules 22 forming the liquid crystal layer 20, orientation was not performed;
   (b) When ZLI2293 was used, orientation was relatively good and the pretilt angle was 0.78±0.14°; and
   (c) When ZLI3086 was used, orientation was performed as normal and the pretilt angle was 0.40±0.21°.
3. Using NMP as a solvent and ZLI3086 as the dispersive liquid crystal molecules 15 in the dispersive liquid crystal orientation layer 14 formed on the upper and lower glass plates 10:
   (a) When ZLI3086 was used as the liquid crystal molecules 22 of the liquid crystal layer 20, orientation was not performed;
   (b) When ZLI2293 was used, orientation was performed as normal and the pretilt angle was 0.36±0.14°; and
   (c) When ZLI3086 was used, orientation was not performed.
4. Using cyclohexanone as a solvent, ZLI1132 as the dispersive liquid crystal molecules 15 in the liquid crystal orientation layer 14 formed on the upper glass plate 10, and ZLI3086 as the dispersive liquid crystal molecules 15 in the dispersive liquid crystal orientation layer 14 formed on the lower glass plate 10:
   (a) When ZLI1132 was used as the liquid crystal molecules forming the liquid crystal layer 20, orientation was not achieved;
   (b) When ZLI2293 was used, orientation was achieved as in a normal state and the pretilt angle was 0.36±0.24°; and
   (c) When ZLI3086 was used, orientation was not performed.

The following were the test results of the extent of orientation and the pretilt angle measured when: a) forming the liquid crystal orientation layer 14 through the use of the LCP95 and liquid crystal molecules, b) using cyclohexanon as a solvent, c) using ZLI 1132 as the dispersive liquid crystal molecules 15 in the liquid crystal orientation layer 14 formed on the upper glass plate 10, using ZLI3086 as dispersive liquid crystal molecules 15 in the liquid crystal orientation layer 14 formed on the lower glass plate 10, and d) using ZLI2293 as the liquid crystal molecules 22 forming the liquid crystal layer 20.

1. When injecting the liquid crystal molecules 22 at 82.9 and annealing LCP95 for two hours at 93° and letting it go through a sudden cooling process, orientation was normal and the pretilt angle appears at 0°.
2. When injecting the liquid crystal molecules 22 at 92.90 and annealing LCP95 for two hours at 9° and letting it cool at room temperature for three hours, orientation was relatively good and the pretilt angle appears at 0°.
3. When injecting the liquid crystal molecules 22 at 46.7° and annealing LCP95 for two hours at 93° and letting it cool for three hours at room temperature, orientation was relatively good and the pretilt angle appears at 0°.
4. When injecting the liquid crystal molecules 22 at room temperature, and annealing LCP95 for two hours at 93° and letting it cool for three hours at room temperature, orientation was normal and the pretilt angle appears at 0°.

When the liquid crystal orientation layer 14 was formed through the use of LCP95+liquid crystal molecules, there appears in a dark background a straight line pattern defect in the direction to which liquid crystal molecules are injected and in the vertical direction, but orientation seems to be performing. If observed again after a period of 50 hours, the overall orientation and the pretilt angle are maintained but transparent curve lines are somewhat smoothed.

The following were the test results of the extent of orientation and the pretilt angle measured when forming the orientation layer with LCP94, LCP100 and LCP105 without dispersive liquid crystal materials and using a tetrachloroethane as a solvent.

1 Using LCP94
   (a) When ZLI1132 was used as, the liquid crystal molecules 22, orientation was not performed;
   (b) When ZLI2293 was used, orientation was not performed normally at first but not after five days; and
   (c) When ZLI3086 was used, orientation was not achieved.
2. Using LCP100:
   (a) When ZLI1132 is used as: the liquid crystal molecules 22, orientation was not performed;
   (b) When ZLI2293 was used, orientation was formed normally and the pretilt angle appears at 0°; and
   (c) When ZLI3086 was used, orientation is not achieved.
3. Using LCP105:
   (a) When ZLI1132, ZLI2293 and ZLI3086 were used as the liquid crystal molecules 22, orientation was not performed.

Also, when using LCP94, LCP100 and LCP105, which do not disperse the liquid crystal molecules, line patterns appeared having lines in parallel, vertical, and liquid crystal molecules injecting directions as when forming the dispersive liquid crystal orientation layer 14 using LCP95+liquid crystal molecules. However, in the remaining areas liquid crystal orientation is performed by the interaction between the dispersive liquid crystal orientation layer 14 and the liquid crystal molecules.

As shown in the various experiments above, the best results are achieved when using LCP95 as the orientation layer; forming the dispersive liquid crystal orientation layer, formed on the upper and lower glass plates, by means of using liquid crystal molecules in which there is a large difference in the dielectric constant in the longitudinal axis direction (for example, ZLI1132 having a dielectric constant of the longitudinal axis direction of 15 and ZLI2293 of 2.9); and using ZLI2293 as the liquid crystal molecules forming the liquid crystal layer.

In the LCD cell of the present invention formed as in the above, as the orientation process is not performed by means of rubbing but by means of cooling slowly after dispersing and heating liquid crystal molecules on the orientation layer, the creation of static electricity and the possibility of contamination from a cloth, as used in the orientation process of the prior art, are prevented.

While this invention has been described in connection with what is presently considered to be the most practical and preferred embodiment, it is to be understood that the invention is not limited to the disclosed embodiments, but on the contrary, is intended to cover various modifications and equivalent arrangements included within the spirit and scope of the appended claims.

What is claimed is:

1. A liquid crystal display cell comprising:

first and second panels spaced apart from each other and extending parallel to each other;

first and second conductive layers disposed between and respectively on the first and second panels;

first and second orientation layers covering the first and second conductive layers, respectively, each of the first and second orientation layers comprising a polymer material and a liquid crystal material dispersed in the polymer material, said liquid crystal material being about 5–30 wt %; and a liquid crystal layer disposed between the first and second orientation layers.

2. The liquid crystal display cell according to claim 1, wherein the polymer material is selected from the group consisting of polyimide, polyamide, and liquid crystal polymer, each being fusible in a solvent.

3. The liquid crystal display cell according to claim 2, wherein the solvent is selected from the group consisting of r-butyrolactone, cyclohexanone, tetrachloroethane, and N-methyl pyrrolidinone (NMP).

4. A liquid crystal display cell comprising:

first and second panels spaced apart from each other and extending parallel to each other;

first and second conductive layers disposed between and respectively on the first and second panels;

first and second orientation layers covering the first and second conductive layers, respectively, each of the first and second orientation layers comprising a polymer material and a liquid crystal material dispersed in the polymer material, wherein the polymer materials of the first and second orientation layers are different from each other; and a liquid crystal layer disposed between the first and second orientation layers.

5. The liquid crystal display cell according to claim 4, wherein the polymer material is selected from the group consisting of polyimide, polyamide, and liquid crystal polymer, each being fusible in a solvent.

6. The liquid crystal display cell according to claim 5, wherein the solvent is selected from the group consisting of r-butyrolactone, cyclohexanone, tetrachloroethane, and N-methyl pyrrolidinone (NMP).

7. A method of making a liquid crystal display cell having a liquid crystal layer, comprising the steps of:

depositing a conductive layer on each of two glass plates;

depositing an orientation layer on each of the conductive layers, each of the orientation layers comprising a polymer material having liquid crystal molecules dispersed therein;

heat-treating the liquid crystal orientation layers; and cooling the orientation layers.

8. The method according to claim 7, further comprising the step of forming a liquid crystal layer after the liquid crystal orientation layers are heat-treated.

9. The method according to claim 8, wherein the liquid crystal layer is formed during the cooling of the orientation layers.

10. The method according to claim 7, wherein a temperature at which the liquid crystal orientation layers are heat-treated is higher than an isotropic temperature of the polymer material.

11. The method according to claim 7, wherein the liquid crystal material dispersed in the polymer material is about 5–30 wt %.

12. The method according to claim 7, wherein the polymer material is selected from the group consisting of polyimide, polyamide, and liquid crystal polymer, each being fusible in a solvent.

13. The method according to claim 12, wherein the solvent is selected from the group consisting of r-butyrolactone, cyclohexanone, tetrachloroethane, and N-methyl pyrrolidinone (NMP).

14. The method according to claim 12, wherein the polymer materials of their respective orientation layers are different from each other.

15. A method of forming an orientation layer on a liquid crystal display cell, comprising the steps of:

preparing a mixture by mixing a polymer mixture and a liquid crystal material;

depositing the mixture on panels of the cell;

heat-treating the cell; and cooling the cell.

16. The method according to claim 15, wherein a temperature at which the cell is heat-treated is higher than an isotropic temperature of the polymer material.

17. The method according to claim 15, wherein the liquid crystal material mixed with the polymer material is about 5–30 wt %.

18. The method according to claim 15, wherein the polymer material is selected from the group consisting of polyimide, polyamide, and liquid crystal polymer, each being fusible in a solvent.

19. The method according to claim 18, wherein the solvent is selected from the group consisting of r-butyrolactone, cyclohexanone, tetrachloroethane, and N-methyl pyrrolidinone (NMP).

* * * * *